United States Patent
Wänstedt et al.

(10) Patent No.: US 11,134,537 B2
(45) Date of Patent: Sep. 28, 2021

(54) INTERRUPTING USE OF COMMUNICATION RESOURCES

(71) Applicant: Telefonaktiebolaget LM Ericsson (publ), Stockholm (SE)

(72) Inventors: Stefan Wänstedt, Luleå (SE); Tommy Arngren, Luleå (SE); Peter Ökvist, Luleå (SE)

(73) Assignee: Telefonaktiebolaget LM Ericsson (Publ)

( * ) Notice: Subject to any disclaimer, the term of this patent is extended or adjusted under 35 U.S.C. 154(b) by 629 days.

(21) Appl. No.: 15/999,518

(22) PCT Filed: Feb. 18, 2016

(86) PCT No.: PCT/EP2016/053447
§ 371 (c)(1),
(2) Date: Aug. 17, 2018

(87) PCT Pub. No.: WO2017/140364
PCT Pub. Date: Aug. 24, 2017

(65) Prior Publication Data
US 2021/0212157 A1    Jul. 8, 2021

(51) Int. Cl.
*H04W 76/36* (2018.01)
*H04W 4/10* (2009.01)
(Continued)

(52) U.S. Cl.
CPC ............. *H04W 76/36* (2018.02); *H04W 4/10* (2013.01); *H04W 72/10* (2013.01); *H04W 76/45* (2018.02)

(58) Field of Classification Search
CPC ....... H04W 76/36; H04W 72/10; H04W 4/10; H04W 76/45
See application file for complete search history.

(56) References Cited

U.S. PATENT DOCUMENTS

| 5,960,362 A | 9/1999 | Grob et al. |
| 5,983,114 A | 11/1999 | Yao et al. |

(Continued)

FOREIGN PATENT DOCUMENTS

| WO | 9750266 | 12/1997 |
| WO | 9750267 A2 | 12/1997 |
| WO | 2007013730 | 2/2007 |

OTHER PUBLICATIONS

International Search Report and Written Opinion dated Nov. 2, 2016 for International Application No. PCT/EP/2016/053447 filed on Feb. 18, 2016, consisting of 9-pages.
(Continued)

*Primary Examiner* — Mazda Sabouri
(74) *Attorney, Agent, or Firm* — Christopher & Weisberg, P.A.

(57) ABSTRACT

Methods and apparatus enabling interruption of the use of communication resources by a first UE are disclosed. Interrupt requests (IR) sent from other UEs wishing to interrupt use of the communication resources by the first UE are monitored. If one or more IR are received, an interrupt requirement (IReq) is established, and the allocation of communication resources to the first UE is released in response to the IReq. In some embodiments, if a requirement for continuing use of the communication resources by the first UE is determined during a monitoring period, the IReq is reversed and the allocation of communication resources to the first UE is continued so that communication is not interrupted. Embodiments of the invention enable interruption of a high priority user by a co-ordinated or synchronised interrupt requests from UEs with lower priority.

20 Claims, 5 Drawing Sheets

(51) Int. Cl.
*H04W 76/45* (2018.01)
*H04W 72/10* (2009.01)

(56) References Cited

U.S. PATENT DOCUMENTS

| | | | |
|---|---|---|---|
| 2008/0153432 A1 | 6/2008 | Zhu et al. | |
| 2010/0056077 A1 | 3/2010 | Seshadri et al. | |
| 2017/0094457 A1* | 3/2017 | Lee | H04W 4/10 |
| 2017/0142756 A1* | 5/2017 | Lee | H04W 76/45 |
| 2017/0257876 A1* | 9/2017 | Loehr | H04L 5/0044 |
| 2018/0077208 A1* | 3/2018 | Li | H04W 4/10 |

OTHER PUBLICATIONS

ETSI TS 122 179 V13.3.0; Universal Mobile Telecommunications System (UMTS); LTE; Mission Critical Push to Talk (MCPTT) over LTE; Stage 1; (3GPP TS 22.179 version 13.3.0 Release 13); Jan. 2016, consisting of 81-pages.

* cited by examiner

INTERRUPTING USE OF COMMUNICATION RESOURCES

CROSS-REFERENCE TO RELATED APPLICATIONS

This application is a Submission Under 35 U.S.C. § 371 for U.S. National Stage Patent Application of International Application Number: PCT/EP2016/053447, filed Feb. 18, 2016 entitled "INTERRUPTING USE OF COMMUNICATION RESOURCES," the entirety of which is incorporated herein by reference.

TECHNICAL FIELD

This disclosure relates to interrupting use of communication resources of a communication network by user equipment (UE). The disclosure is particularly, but not exclusively, related to interrupting use of communication resources allocated to a UE in a push to talk (PTT) group.

BACKGROUND

PTT services are used in a number of different applications, for example in public safety applications, such as by fire services or police forces; in general commercial applications, for example by utility companies, industrial users, taxi firms or delivery networks; and in transport applications, for example by bus or train operators. One example of a PTT service is a group call in a PTT group comprising a number of group member UEs. At any one time during the PTT group call, only one group member UE is permitted to transmit data to the other group members using communication resources of a communication network. This data may be voice data, video data or any other useful data.

There is growing interest in using commercially deployed communication networks to provide PTT services, since this avoids the need to build a separate PTT network and allocate specific spectrum to the PTT network. As a result, PTT services can be provided in a more cost-effective manner.

The use of communication networks such as the Evolved packet system, which uses a Long Term Evolution (LTE) network for radio access, to provide PTT services is being developed. It is expected that LTE networks and future communication networks will efficiently support PTT services. Access to PTT service via the communication network can be described as "on-network" or "on-net".

Direct device to device (D2D) communication between UEs, which uses the communication resources of the network without network control, enables users to communicate with each other when out of network coverage or when the network infrastructure is compromised, in order to enable PTT services. Proximity Services (ProSe) applications defined for the LTE network, including a PC5 interface providing D2D communication, are standardised by the 3$^{rd}$ Generation Partnership Project (3GPP). The PC5 interface uses radio channels defined within the radio frequency spectrum allocated to a LTE network to provide D2D communication without network control. Access to PTT service via D2D can be described as "off-Network" or "off-net".

Mission critical PTT (MCPTT) groups operate during a mission critical event, such as an emergency situation or a situation of imminent peril, as defined by the Service and System Aspects SA1 requirements under standardisation by 3GPP. The group members of a MCPTT group are typically emergency services personnel involved in handling the mission critical event.

A UE may be allocated communication resources in precedence over other UEs, for example so that other UEs may be prevented from communicating in the communication network. A problem may occur within a PTT group call during a mission critical event if a PTT group member UE is not making effective use of the allocated communication resources. Such a situation may occur, for example, when a user is unconscious but the UE associated with the user is seizing the use of communication resources on a priority basis. In this situation, the communication of the group members involved in the emergency situation is restricted, which may hamper the work that needs to be carried out by the group. In addition, the communication of group members of other PTT groups may also be restricted. It is desirable to enable communication by such a UE to be interrupted so that communication resources are released for other UEs.

Patent publication U.S. Pat. No. 5,983,114 discloses a system to address this problem in a PTT group. In this patent publication, a communication network assesses data being transmitted from a group member having priority to transmit to other group members through the network, in order to determine whether or not useful speech data is being transmitted. If no speech data is identified over a period of time, the right to transmit to other group members is revoked.

The invention seeks to overcome at least some of the disadvantages of the prior art and seeks to provide a novel apparatus and method for interrupting use by a UE of communication resources of a communication network.

SUMMARY

According to a first aspect of the disclosure, there is provided an apparatus for interrupting use of first communication resources of a communication network used by a first user equipment, UE, having a first priority level, which first communication resources are allocated to the first UE in precedence over other UEs having the same priority as or a lower priority level than the first UE. The apparatus comprises an interrupt manager, IM, arranged to monitor reception of interrupt requests, each interrupt request being received from one of the other UEs, to establish an interrupt requirement in response to reception of one or more interrupt requests, and to release the allocation of the first communication resources to the first UE in response to the interrupt requirement.

According to a second aspect of the disclosure, there is provided a method for interrupting use of first communication resources of a communication network used by a first user equipment, UE, having a first priority level, which first communication resources are allocated to the first UE in precedence over other UEs, each other UE having the same priority level as or a lower priority level than the first UE. Reception of interrupt requests (IR) from the other UEs is monitored. An interrupt requirement (IReq) is established in response to reception of one or more IR from the other UE. The allocation of the first communication resources to the first UE is released in response to the IReq.

According to a third aspect of the disclosure, there is provided an apparatus for interrupting use of first communication resources of a communication network used by a first user equipment, UE, which first communication resources are allocated to the first UE in precedence over other UEs. The apparatus comprises an interrupt manager arranged to monitor reception of interrupt requests, each interrupt request being received from one of the other UEs, to establish an interrupt requirement in response to reception of at least two interrupt requests. The interrupt manager is arranged to release the allocation of the first communication resources to the first UE in response to the interrupt requirement.

According to a fourth aspect of the disclosure, there is provided a method for interrupting use of first communication resources of a communication network used by a first user equipment, UE, which first communication resources are allocated to the first UE in precedence over other UEs. Reception of interrupt requests (IR) from the other UEs is monitored. An interrupt requirement (IReq) is established in response to reception of at least two IR from other UE. The allocation of the first communication resources to the first UE is released in response to the IReq.

Embodiments of the invention enable interrupt of use of communication resources by the first UE after reception of at least one interrupt request (IR), providing an alternative mechanism for interrupting use of the communication resources that does not rely on a timer or action by a dispatcher.

In addition, the communication by the first UE can be interrupted without the permission of or any requirement for action by the user of the first UE. This enables the communication to be interrupted reliably in the situation where the user of the first UE is unconscious or otherwise unresponsive, and cannot discontinue use of the resources themselves.

Embodiments enable the interruption of communication of a user having a high priority level by one or more users having lower priority levels, thus enabling the resetting of priority levels within a group.

The UE has a PTT client to enable the UE to operate in a PTT group. In some embodiments, the UE is pre-configured with the PTT client, or in some embodiments the PTT client may be installed or configured as appropriate during use of the UE to enable the UE to operate in the PTT group.

A network group handler (GH) is required to enable a group of UEs to operate in an on-network group, The GH may be implemented as a function of a PTT server in the communication network, or in any other suitable network entity.

In one embodiment, the PTT service is bundled with the GCS AS (Group Call Service Application Server) as defined in 3GPP TS 23.179. In other embodiments, the PTT service is provided by a separate server/cloud service operating a subset of the GCS functions.

In some embodiments, use by the first UE of the allocated resources is to the exclusion of the other UEs. This exclusion may be between group members of a PTT group, or may relate to exclusion of the other UE from communication resources generally. This may be particularly so for communication resources that have relatively low capacity, such as is typically the case for a D2D interface.

In some embodiments, the PTT function in a UE is provided as a PTT application.

In some embodiments, the interrupt request is generated by a UE in response to an interrupt request indication from the user.

In some embodiments, an interrupt request is implicit so that, for example, a request for communication resources from another UE is considered as an interrupt request. In other embodiments, the interrupt request is provided by explicit interrupt request message or explicit interrupt request signalling defined within the floor control protocols and/or within D2D interface protocols.

In one aspect of the disclosure, the interrupt manager is arranged to determine a respective time of reception of each interrupt request, and to establish the interrupt requirement when at least two interrupt requests are received in a single interrupt period.

In another aspect of the disclosure, the method further comprises determining a respective time of reception of each interrupt request, and establishing the interrupt requirement when at least two interrupt requests are received in a single interrupt period.

In some embodiments, the IReq is established in response to reception of associated IR. In some embodiments the IR are associated by whether the IR are received in a single interrupt period, and are therefore considered to be received substantially simultaneously. Requiring that the IRs are received substantially simultaneously ensures that the IR received in that interrupt period are likely to relate to the same event or to the same status of the user of the first UE. The interrupt period may be selected accordingly. In one embodiment, the interrupt period is at least one scheduling period of a scheduling control channel.

An IReq is determined when a sufficient number of IR are received during an IR determining period. In different embodiments, the required number of received IR necessary to trigger the establishment of an IReq may be selected as required. In some embodiments, the number of IRs required to establish an IReq is one, but is typically at least two or three, but the number may be even higher, such as five or ten. The number of IR required may be based at least partly on the size of the PTT group and/or the expected proximity of interrupting UEs.

In one aspect of the disclosure, the interrupt manager sends a resource allocation release (RAR) to the other UEs after the establishment of the interrupt requirement, the RAR indicating release of the allocation of the first communication resources to the first UE.

In another aspect of the disclosure, the method comprises sending a resource allocation release (RAR) to the other UEs after the establishment of the interrupt requirement, the resource allocation release indicating release of the allocation of the first communication resources to the first UE.

In some embodiments, the other UEs are other UEs in the same PTT group. In other embodiments, the other UE may be other UEs in the surrounding area using a D2D interface.

In some embodiments, this step is carried out after the resources are released to inform the other UE of the release of the resources instead of the establishment of the IReq.

In some embodiments, the RAR are communicated using explicit messaging or signalling. In other embodiments, the RAR may be implicit in other messaging or signalling.

In one aspect of the disclosure, after sending a resource allocation release, the interrupt manager is arranged to monitor reception of an interrupt confirmation from one or more of the other UEs, and to reverse the interrupt requirement unless at least one interrupt confirmation is received within a confirmation time period.

In another aspect of the disclosure, after sending a resource allocation release, the method also comprises monitoring reception of an interrupt confirmation from one or more of the other UEs, and reversing the interrupt requirement unless at least one interrupt confirmation is received within a confirmation time period.

In some embodiments, an interrupt confirmation (IC) is communicated using explicit messaging or signalling. In other embodiments, the IC may be implicit in other messaging or signalling.

The receipt of IC after the resources have been released indicates that the interrupt has been confirmed by the other UE. If IC are not received, the IM may consider that the release of resources is not justified, and may restore use of the communication resources. This enables the correctness of the IReq to be evaluated in view of updated information from the other UE, in order to reverse an unnecessary interruption to the communication of the first UE.

In some embodiments, the interrupt manager reverses the interrupt requirement unless an interrupt confirmation is received from at least one UE other that the UE from which the IR was received. This ensures that an interrupt requirement is only actioned when at least two UE indicate that an interrupt is required.

In one aspect of the disclosure, the interrupt manager is arranged to determine, after the interrupt requirement is established, whether the first UE has a requirement for continuing use of the first communication resources, and to reverse the established interrupt requirement if the requirement for continuing use is determined during a monitoring period.

In another aspect of the disclosure, the method further comprises the steps of determining, after the interrupt requirement is established, whether the first UE has a requirement for continuing use of the first communication resources, and reversing the established interrupt requirement if the requirement for continuing use is determined during a monitoring period.

Determining whether the communication by the first UE should continue despite the establishment of the interrupt requirement allows the correctness of the interrupt to be evaluated in view of changing circumstances or additional knowledge prior to the interrupt actually occurring, and therefore prevents unnecessary interruption to the communication of the first UE. In different embodiments, updated information regarding the first UE, or the other UEs or the communication of the UE may be used to determine whether the communication should continue.

In some embodiments, the IM determines whether there is a requirement for continuing use of the communication resources by the first UE before the release of resources in response to the establishment of the IReq is carried out. In some embodiments, the IReq might be acted on immediately, and the resources released, without any monitoring period. In this case, the monitoring of the requirement for continuing use of the resources may be carried out after the resources are released or may be omitted entirely.

In one aspect of the disclosure, the interrupt manager is arranged to monitor reception of interrupt revoke requests from the other UEs after the interrupt requirement is established, and to reverse the established interrupt requirement if at least one interrupt revoke request is received during a monitoring period.

In another aspect of the disclosure, the method further comprises monitoring reception of interrupt revoke requests from the other UEs after the interrupt requirement is established, and reversing the established interrupt requirement if at least one interrupt revoke request is received during a monitoring period.

The receipt of an interrupt revoke requests (IRR) indicates that the user of an interrupting UE considers that an interrupt is no longer required. If a sufficient number of IRR are received, it can be assumed that the UE is now able to make use of the communication resources again, and the IReq can be cancelled. This allows the correctness of the IReq to be evaluated in view of updated information from the other UEs in order to prevent unnecessary interruption to the communication of the UE.

In different embodiments, the number of IRR required to revoke the IReq may be the same as or less than or more than the number of IR required to establish the IR in the first place. Typically, the number of IRR required is the same as the number of IR. In some embodiments, the number of IRRs required to revoke the IReq is one, but is typically at least two or three, but the number may be even higher, such as five or ten. The number of IRR required may be based at least partly on the size of the PTT group and/or the expected proximity of interrupting UEs.

In one aspect of the disclosure, the interrupt manager is arranged to monitor reception of an interrupt sequence over-ride, ISO, from the first UE after the interrupt requirement is established, and to reverse the established interrupt requirement if an ISO is received during a monitoring period.

In another aspect of the disclosure, the method also comprises monitoring reception of an interrupt sequence over-ride, ISO, from the first UE after the interrupt requirement is established, and reversing the established interrupt requirement if an ISO is received during a monitoring period.

In disclosed embodiments, the user action required to invoke an over-ride is distinct from the user action required to request permission to talk, so as to ensure that the over-ride is a result of a deliberate action on the part of the user.

The receipt of an ISO indicates specifically that the user of the first UE is aware and responsive, and indicates more generally that the user of the first UE considers that an interrupt is not required. The IM may therefore consider that the communication of the first UE does not need to be interrupted, and the IReq can be cancelled. This allows the correctness of the IReq to be evaluated in view of updated information from the first UE, in order to prevent unnecessary interruption to the communication of the UE.

In one aspect of the disclosure, the interrupt manager is arranged to monitor, in response to the interrupt requirement, the use of communication resources of the communication network by the first UE to detect transmission of valid data, and to reverse the established interrupt requirement if valid data is detected during a monitoring period.

In another aspect of this disclosure, the method also comprises monitoring, in response to the interrupt requirement, the use of communication resources of the communication network by the first UE to detect transmission of valid data, and reversing the established interrupt requirement if valid data is detected during a monitoring period.

The detection of valid data in the communication of the first UE indicates that the user of the first UE is making use of the allocated resources. The IM may therefore consider that the communication of the first UE does not need to be interrupted, and that the IReq can be cancelled. This allows the correctness of the IReq to be evaluated in view of updated information relating to the communication by the first UE, in order to prevent unnecessary interruption to the communication of the first UE.

In one aspect of the disclosure, in response to the reversal of the interrupt requirement, the interrupt manager is arranged to restore allocation of the first communication resources to the first UE.

In another aspect of the disclosure, the method comprises, in response to the reversal of the interrupt requirement, restoring allocation of the first communication resources to the first UE.

In some embodiments, each of the first UE and the other UEs is configured with a respective priority level, and the allocation of the first communication resources of the communication network is determined by the respective priority levels. The interrupt manager may carry out this method step.

In some embodiments, the priority level may be a configured priority level allocated by a PTT call control entity and/or floor control entity for a PTT group.

In some embodiments, the configuring of the priority level is dynamic and triggered by a higher layer application. The configuring of the priority level may allow network elements such as a PTT group handler to control the configuration of priorities between the UEs.

In some embodiments, the respective priority level of the first UE and/or the other UEs is based on a user attribute associated to the respective one of the first UE and the other UEs and a group attribute associated with a group to which the respective one of the first UE and the other UE belongs. The priority level can therefore be based on attributes that are specific to the role the user of a UE plays in each emergency situation.

In some embodiments, the respective priority level applied to data transmissions is selected by a UE from a range of values of priority levels available for transmission. In some embodiments, the priority level is a ProSe Per Packet Priority (PPPP).

In one aspect of the disclosure, the first UE and other UEs belong to a group and the interrupt manager comprises a floor controller for the group that determines which member of the group is allocated use of the first communication resources. The floor controller is arranged to receive the interrupt requests by using floor control protocols and to release the allocation of the first communication resources to the first UE by using floor control protocols that revoke grant of the floor to the first UE.

In another aspect of this disclosure, there is provided a method in a floor controller for a group to which the first UE and other UEs belong that determines which member of the group is allocated use of the first communication resources. The method also comprises receiving the interrupt requests by using floor control protocols and releasing the allocation of the first communication resources to the first UE by using floor control protocols that revoke grant of the floor to the first UE.

When the invention is implemented in a floor controller for a group of UEs, the interruption of communication operation can be integrated with floor control protocols operational in a PTT group of UEs. The PTT group may be an off-network group, or may be an on-network group.

In one aspect of the disclosure, the interrupt manager is arranged to inform the first UE of the release of the allocation of communication resources.

In another aspect of this disclosure, the method also comprises informing the first UE of the release of the allocation of communication resources.

This may be useful in embodiments in which the IM is implemented in the communication network. In one example, the IM may be implemented as a Group Handler operating as a floor controller for an on-network PTT group. This enables the first UE to take action to release the communication resources, if necessary.

In one aspect of the disclosure, the interrupt manager is a D2D manager operable to schedule transmissions by the first UE. The D2D manager is arranged to receive one or more interrupt request(s) and to release the allocation of the first communication resources to the first UE by stopping scheduling transmissions by the first UE.

In another aspect of the disclosure, the method in a D2D manager operable to schedule transmissions by the first UE comprises receiving one or more interrupt request(s) and releasing the allocation of first communication resources to the first UE by stopping scheduling transmissions by the first UE.

In embodiments in which the IM is implemented as a D2D Manager operable to schedule transmissions by the first UE, IR may be received from any other UE on a scheduling control channel.

In embodiments of the invention, the requests are received from other UE on a control channel used to schedule communications. In some embodiments, the control channel is scheduling control channel of a direct device to device interface. The D2D interface may be the PC5 interface supporting Proximity Services (ProSe) applications in network 12. The scheduling control channel for PC5 is the Physical Sidelink Control Channel (PSCCH).

IR can be received from any other UE that can access the scheduling control channel regardless of whether the other UE is in an on-network or off-network PTT group with the first UE or not. This has the advantage that any UE affected by the use of the communication resources by the first UE is able to request that the continuing use is interrupted.

In some embodiments, the IM is implemented in the first UE. This enables the first UE to manage the interrupt directly. The IM is typically implemented as either a floor controller, for managing floor control in an off-network PTT group, or a D2D manager for scheduling resources on a D2D interface.

The IM might be implemented as software running on appropriate hardware. Thus, in a further aspect, the invention may comprise apparatus for interrupting use of first communication resources of a communication network used by a first user equipment, UE, having a first priority level, which first communication resources are allocated to the first UE in precedence over other UEs having the same priority level as or a lower priority level than the first UE. The apparatus comprises a processor and a memory, the memory containing instructions executable by the processor, whereby said apparatus is operative to carry out the claimed method.

In a further aspect, the invention comprises a computer program product having computer program logic arranged to put into effect the method of the claimed invention.

In a yet further aspect, the invention comprises a computer-readable medium having computer-executable instructions adapted to cause a computer system to carry out the method of the claimed invention.

Specific embodiments are described below, by way of example only, with reference to the accompanying drawings.

DETAILED DESCRIPTION

Embodiments of the invention enable the use of communication resources of a communication network by a PTT user to be interrupted, and extend to any present or future communication network that supports PTT.

A PTT user may use the communication resources of a communication network either in an on-network mode or in an off-network mode. Disclosed embodiments of the invention enable interruption of both on-network use of communication resources of a communication network by the PTT user and off-network use of the communication resources of a communication network by the PTT user.

Figure 1:
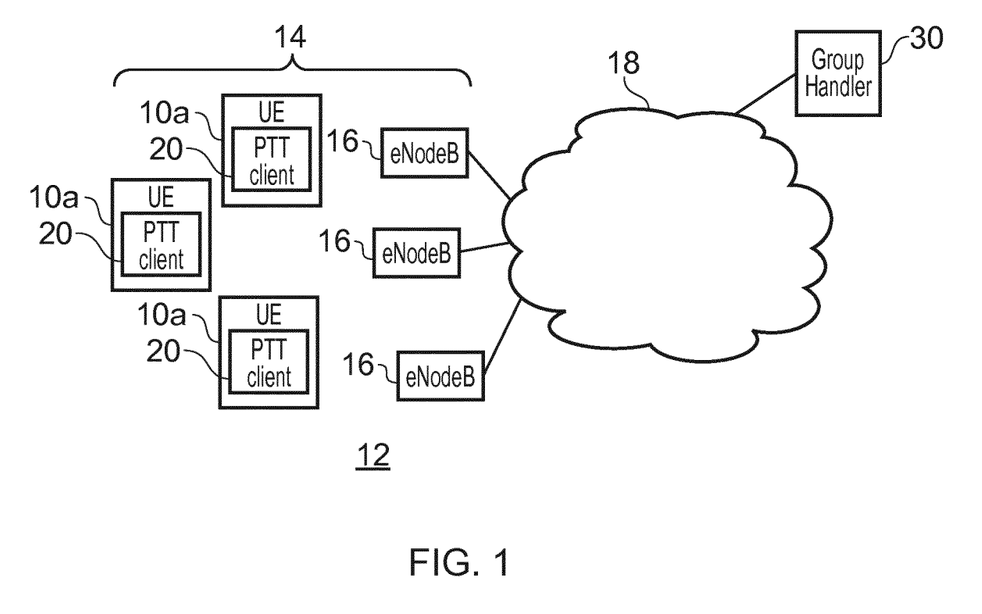
FIG. 1 is a block diagram showing the main elements of a communication network.
Figure 2:
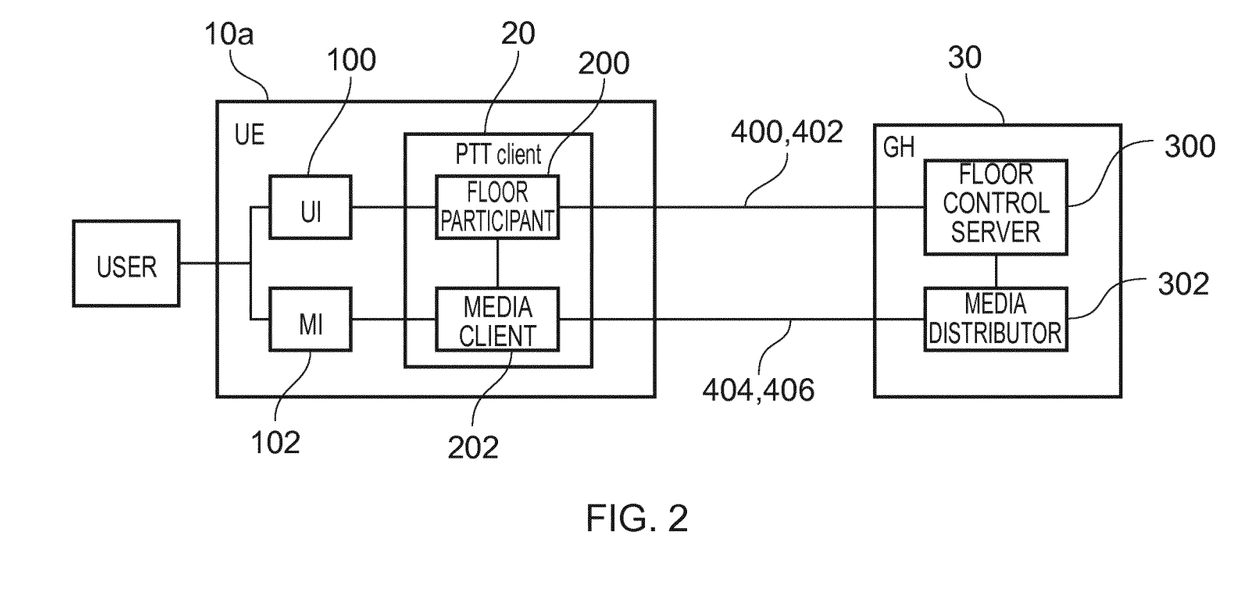
FIG. 2 is a block diagram showing the main functional elements of a UE and a PTT group handler shown in FIG. 1.

An on-network use of communication resources of a communication network by a PTT user, which can be interrupted using disclosed embodiments of the invention, is disclosed with reference to FIGS. 1 and 2.

FIG. 1 is a block diagram showing elements of a communication network for providing communication services to a plurality of UEs 10a. The UEs 10a establish communication links with the communication network and are said to be operating on-network.

In the disclosed embodiment, the communication network is a network 12 including a Long Term Evolution (LTE) radio access network and a core network.

The LTE radio access network is the Evolved Universal Mobile Terrestrial Radio Access Network (E-UTRAN) 14. The E-UTRAN 14 has a number of base stations arranged to establish radio links with the UEs 10a. The base stations for the E-UTRAN 14 are evolved Node Bs (eNodeB) 16, which communicate with the UEs 10a using the Evolved Universal Mobile Terrestrial Radio Access (E-UTRA) air interface.

The core network for the network 12 is the Evolved Packet Core (EPC) 18. The EPC 18 is coupled to the eNodeBs, and provides routing and connection services between eNodeBs or between an eNodeB and an external network, as well as network services such as user authentication.

The network 12, E-UTRAN 14, eNodeB 16 and EPC 18 are all under standardisation by 3GPP.

The UEs 10a shown are operating as a PTT group, and each UE 10a is a group member of the PTT group.

In order to enable the UEs 10a to operate as a PTT group, each UE 10a has an PTT client 20 and the network 12 has a PTT group handler (GH) 30. In the disclosed embodiment, GH 30 is implemented as a function of a PTT server located in the IP multimedia Subsystem (IMS) of the network 12.

FIG. 2 is a block diagram showing the main functional elements of a UE 10a and GH 30. It is noted that the described functions of the PTT client 20 and the GH 30 can be implemented in a number of different ways, and the invention is not limited to the specific functional entities described herein.

The described functional entities of the PTT client 20 and the GH 30 are implemented as software running on appropriate hardware in the UE 10a and in the GH 30.

The UE 10a comprises user interface (UI) 100; media interface (MI) 102, and PTT client 20. PTT client 20 comprises floor participant 200 and media client 202. The GH 30 comprises floor control server 300 and media distributor 302.

UI 100 is arranged to communicate with a user of the UE 10a to provide information, requests or instructions to the user and to receive information, requests or instructions from the user. Typically, the UI 100 is a Man-Machine Interface enabling communication with a user aurally, visually or through the use of touch, for example by means of physical or virtual buttons. The UI 100 is coupled to floor participant 200.

MI 102 is arranged to capture user data, such as voice, video or other data, from the user, or from the UE 10a or the environment around the UE 10a, and to present to the user any user data that is received from another PTT group member. The MI 102 is coupled to the media client 202. UI 100 and MI 102 have many common elements and in the disclosed embodiment are combined.

Floor participant 200 is coupled to the UI 100. During a PTT group call, the floor participant 200 has an active uplink control plane bearer connection 400 and an active downlink control plane bearer connection 402 established with the floor control server 300 to enable exchange of floor control messages with the floor control server 300.

Media client 202 is coupled to MI 102 to allow exchange of user data with MI 102. During a PTT group call, the media client 202 has an uplink user plane bearer connection 404 and a downlink user plane bearer connection 406 established with the media distributor 302. The uplink bearer connection 404 is an Evolved Packet System (EPS) bearer, and downlink bearer connection 406 is an EPS bearer or a Multimedia Broadcast Multicast Services (MBMS) bearer. Media client 202 uses these bearers to send real time transport protocol (RTP) media packets, containing user data captured by MI 102, to media distributor 302 over the uplink bearer connection 404, and to receive real time transport protocol (RTP) media packets from media distributor 302 over downlink bearer connection 404. Floor participant 200 is coupled to media client 202 to control the operation of media client 202.

In an ongoing PTT call, media distributor 302 has active bearer connections (not shown) with the respective media client 202 of each group member. The media distributor 302 receives RTP media packets from the transmitting media client 202 over respective uplink user plane bearer 404, and sends the RTP media packets to the respective media clients 202 of the other group members over respective downlink user plane bearer 406.

Floor control is used within a PTT group to ensure that, at any one time, one PTT client 20 has grant of the floor. The UE 10a with the PTT client 20 having grant of the floor is able to use the communication resources to transmit to the other group members, and is said to be allocated the resources.

The floor control server 300 takes floor control decisions to determine which group member should have grant of the floor. The respective floor participant 200 of group members UE 10a exchange floor control messages with floor control server 300 and perform floor control actions in the PTT client 20, for example by communicating to the floor control server 300 a desire to talk by the user, and by communicating to the user the decision of the floor control server 300.

The floor control server 300 informs a floor participant 200 of a group member of grant of the floor, and thereafter the respective floor participant 200 enables the uplink transmission of user data. The floor control server 300 controls the distribution of media data by media distributor 302 to ensure that the transmitted data is distributed to the other group members.

In the disclosed embodiment, the floor control operation for a PTT call is managed using one or more state machines. A state machine for the MCPPT call and separate state machines for each PTT client 20 associated with the call are created. The state machine for the PTT call embodies the floor state and identifies the PTT client 20 to which the floor is granted. The permitted actions associated with the state of each of the PTT clients 20 of group members are defined. Transitions between states in the state machine may result from signaling received from floor participants 200 of group members or may result in floor control messages being sent to the floor participants 200 of group members. Transitions between states of the state machine for the PTT call are made in response to changes in the state machines for each of the PTT clients 20 and the floor control rules applied to those changes.

Figure 3:
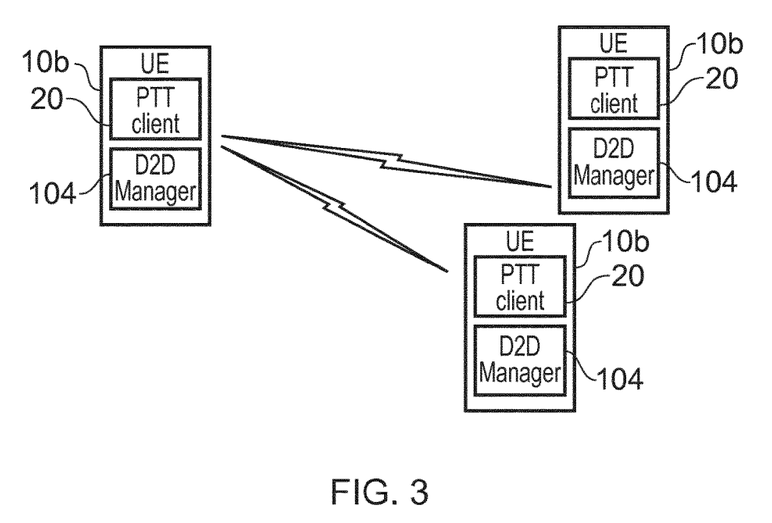
FIG. 3 is a block diagram showing UEs operating outside the control of the radio communication network.
Figure 4:
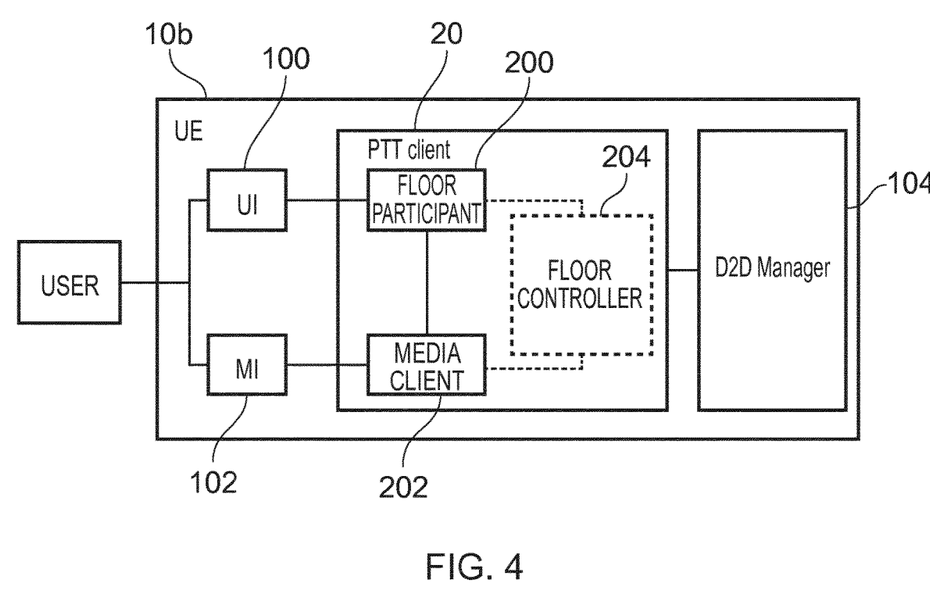
FIG. 4 is a block diagram showing the main functional elements of a UE shown in FIG. 3.

An off-network use of communication resources of a communication network by a PTT user, which can be interrupted using disclosed embodiments of the invention, is disclosed with reference to FIGS. 3 and 4.

FIG. 3 is a block diagram showing UEs 10*b* that are outside the control of the network 12. UEs 10*b* communicate directly with each other using a D2D interface, and are said to be operating off-network. Off-network operation relies on D2D communication between UEs, which may be useful in particular in locations where there is no coverage by the network 12 or where the UEs 10*b* are within network coverage but are in an operating mode in which they are not under network control.

Although the UEs 10*b* do not establish radio communication links with the eNodeBs 16, the D2D interface between the UEs 10*b* uses spectrum and signalling channels belonging to the network 12, and the D2D interface therefore uses communication resources of the network 12.

UEs 10*b* shown in FIG. 3 operate as a PTT group, and each UE 10*b* is a group member of the PTT group.

FIG. 4 is a block diagram showing the main functional elements of UEs 10*b* shown in FIG. 3. However, it will be understood that the described functions of the UE 10*b* can be implemented in different ways, and the invention is not limited to the specific functional entities described herein.

The UE 10*b* comprises user interface (UI) 100; a media interface (MI) 102; D2D manager 104 and the PTT client 20. The PTT client 20 comprises a floor participant 200 and a media client 202. In addition, the PTT client 20 is provided with a floor controller 204 coupled to the floor participant 200 and to the media client 202. Elements of the UE 10*b* shown in FIG. 4 that are the same as or are similar to corresponding elements of the UE 10*a* shown in FIG. 2 have been given the same or corresponding reference numerals, and are not described in detail further.

The described functional entities of the PTT client 20 and the D2D manager 104 are implemented as software running on appropriate hardware in the UE 10*b*.

The floor control operation for an off-network PTT call is carried out by the floor controller 204 of the PTT group member UE 10*b* currently granted the floor. The respective floor participants 200 of group members exchange floor control messages with floor controller 204 and the floor controller 204 takes floor control decisions to determine which group member UE 10*b* of the off-network PTT group should have grant of the floor. In disclosed embodiments, the floor control operation is managed using one or more state machines as described above.

The UI 100, MI 102, floor participant 200 and media client 202 are coupled to each other and operate generally as described above with reference to FIG. 2. However, UE 10*b* communicates with other UEs 10*b* in the local area via the D2D PC5 interface.

The D2D manager 104 manages communications with other UEs 10*b* in the local area over the D2D PC5interface. In particular, the D2D manager 104 manages the scheduling of transmissions by a UE 10*b* in accordance with the priority of the transmissions to be made by that UE 10*b* relative to the priority of transmissions to be made by other UEs 10*b* in the area using the D2D interface.

In the disclosed embodiment, the D2D interface is the PC5 interface supporting Proximity Services (ProSe) applications in the network 12 as standardised by 3GPP. The D2D manager 104 comprises a ProSe application operating in accordance with 3GPP TS 23.303.

The PC5 interface provides dedicated physical radio channels in the network 12, namely the Physical Sidelink Control Channel (PSCCH), which carries control information, and the Physical Sidelink Shared Channel (PSSCH), which carries data transmissions. The PSCCH is a signalling/control channel provided to enable UEs 10*b* to exchange scheduling or control information. The PSSCH is a D2D traffic channel provided for transmitting data between UEs 10*b*.

Since the PSSCH is shared between all UEs in the neighbourhood, each D2D manager 104 is able to both schedule data transmissions to be sent by its respective UE 10*b* and also monitor for relevant transmissions.

The UEs 10*b* are pre-configured with the communication resources to be used for data transmission between the UEs 10*b*, so as to enable data transmissions between UEs 10*b* over the D2D PC5 interface. In disclosed embodiments, this pre-configuring or provisioning is achieved when the UE 10*b* is in network coverage, for example over the PC3 interface of the network 12, and/or the UE 10*b* is provisioned directly by a user without involvement by network 12.

More specifically, the UE 10*b* is configured with related information, including up to eight transmission resource pools for autonomously allocating resources as specified in 3GPP TS 36.300, to enable UE 10*b* to communicate while off-network using ProSe Direct Communications as specified in 3GPP TS 23.303. Each pool can have one or more ProSe Per Packet Priority (PPPP) associated with it.

When a data packet is to be transmitted on the PC5 interface, the corresponding Protocol Data Units (PDUs) are allocated a PPPP, which is used to prioritise transmission with respect to other intra-UE transmissions (i.e. PDUs associated with different priorities awaiting transmission inside the same UE) and inter-UE transmissions (i.e. PDUs associated with different priorities awaiting transmission inside different UEs). Priority queues (both intra-UE and inter-UE) are served in priority order, so, for example, all PDUs associated with a PPPP of N are sent before any PDUs associated with PPPP of N+1 are sent, where a lower number means a higher priority.

The PPPP is used by a Media Access Control (MAC) layer entity of the UE 10 to select, from the configured transmission resource pools, a transmission resource pool having an associated PPPP equal to the highest PPPP required by the MAC PDU. The PDU is scheduled for transmission using the transmission resources from the selected transmission resources pool.

In the disclosed embodiment, in order to send data transmissions, called a "transmission pattern", on the PSSCH, a UE 10*b* initially sends a sync signal, which is used as a time reference by a receiving UE 10*b*, followed by a scheduling assignment (SA) on the PSCCH to inform the intended recipients of the transmission pattern. Thereafter the transmission pattern scheduled by the SA is sent on the PSSCH.

The scheduling assignments (SA) are sent on the Sidelink Control Information (SCI) format 0 of the Physical Sidelink Control Channel (PSCCH). SAs contain information required by a receiving UE 10*b* to correctly receive and decode the transmission pattern scheduled by the SA, such as the selected transmission resources, for example the frequencies and timeslot information used for the transmission pattern, the modulation or coding parameters, timing information, and the identities of the transmitter and/or the receiver(s).

UEs 10*b* monitor the D2D PC5 interface in order to identify transmissions of interest to the UE 10*b*, such as transmissions addressed to the UE 10*b*. In the disclosed embodiment, UEs 10*b* monitors the Sidelink Control Information (SCI) of the Physical Sidelink Control Channel (PSCCH). If a scheduled data transmission is addressed to the UE 10*b* individually, or to a group of which the UE 10*b* is a member, the UE 10*b* can identify and receive the data transmissions.

The D2D PC5 interface is used by all UEs in the area, and so UEs 10*b* are also able to monitor for transmissions addressed to UEs in a PTT group call.

It will be understood that, in general, UEs are able to operate on-network or off-network as required. Moreover, a UE 10*a* operating on-network within the coverage area of the network 12 may nevertheless also communicate with nearby UEs 10*b* over the PC5 interface. As a result, unless referring specifically to operation on-network or operation off-network, both UEs 10*a* and UEs 10*b* are referred to as UEs 10 in the following description.

Each UE 10 has a priority level. In the disclosed embodiments, the priority level of a UE 10 is based on user attributes specific to the user of the UE and/or on group attributes related to a PTT group of which the UE 10 is a member.

In disclosed embodiments, UE 10 has user attributes associated with the user of the UE 10. Static user attributes relate to the nature of the user, and may include one or more of: information categorizing the user (for example as a first responder, second responder, supervisor, and dispatcher); appropriate jurisdictional boundaries; a pre-configured system priority level for the user. Dynamic user attributes relate to the user during an in-progress emergency incident, and may include: the user's operational status (on/off duty); the user location; the type of incident, for example an emergency or imminent peril incident; whether the user initiated the group call; whether the user is involved in a formally managed incident, and if so the boundaries of the incident area, the incident severity and any specific role assigned to the user in the resolution of the emergency incident.

In disclosed embodiments, UE 10 also has respective group attributes relating to each PTT group to which the UE 10 belongs. Static group attributes relate to the nature of the group, and may include one or more of: information about the nature/type of the group and the owning agencies, the jurisdictional boundaries for transmitters and receivers within the group, normal hours of operation of the group; pre-emptive dispositions relative to other groups; and a default minimum priority for the group, i.e. the minimum priority characteristic guaranteed to all group members regardless of their individual priority characteristics. Dynamic group attributes relate to the priority of the group during an in-progress emergency incident, and may include: the type of incident, for example PTT Emergency or Imminent Peril, if any the group is handling; and, in the case of a formally managed incident, the boundaries of the incident area and the incident severity.

The floor control operation for an on-network or an off-network PTT group identifies which group member UE 10 is granted the floor and is permitted to transmit to the PTT group. The floor controller grants the floor to the first UE 10 to request the floor. Once UE 10 is granted the floor, a floor request from other group member UE with a lower, or equal, priority level than the current holder of the floor is refused or the floor request is queued until the current holder of the floor relinquishes the floor.

Transmissions on a shared communication resource such as the D2D PC5 interface are made in accordance with the relative priority levels of data transmissions from UEs 10 wishing to communicate on the D2D PC5.

In disclosed embodiments, UEs 10 are configured with rules defining the actions and responsibilities of the UE 10, and the priority level to be used by the UE 10 to transmit data. These priority levels are defined, at least in part, by the user attributes and the group attributes, typically as a function of the static attributes in combination with dynamic attributes relating to the specific situation that has occurred.

UEs are aware of the existence of a PTT group call and determine a priority for data transmission based on whether an emergency PTT group call is in progress, and the involvement of the UE in an on-going emergency PTT group. In a disclosed embodiment, UEs are made aware of the existence of a PTT group call by use of an emergency group identity (EGI) that identifies an emergency PTT group. All UEs 10 that belong to the group are provided with the EGI and transmissions to the EGI are received by all UE 10 in the emergency group. In addition, other UE that are not group members of the PTT group are notified that an emergency PTT group is operating by observing transmissions being made to the emergency group using the EGI.

In the disclosed example of a D2D interface such as the D2D PC5 interface, UE 10*b* determines a range of PPPP available to be allocated to a PDU that UE 10*b* wishes to transmit, based on the user attributes and group attributes for the UE 10*b* and any additional rules specified for the UE 10*b*.

In a first example, a UE 10 with a low static user priority level may respond to an ongoing emergency PTT group call by substantially ceasing transmissions and entering a mode in which the UE is only able to receive transmissions. In this example, the low priority UE selects a PPPP only from the lowest or one or more lower priority PPPP for any PDU it wishes to transmit.

In a second example, a UE 10 of an emergency services commander may be accorded a higher priority level for an emergency incident handled by their emergency service than for an emergency incident handled by other emergency services, and in any event may be accorded a higher priority than UEs 10 belonging to more junior users. In this example, UE 10 selects from one or more higher priority PPPP, or the highest priority PPPP, for any PDU it wishes to transmit during a critical event handled by the user's emergency service; and selects a PPPP only from one or more medium priority PPPPs for any PDU it wishes to transmit during a critical situation handled by another emergency service.

In a third example, a UE 10 initiating an emergency PTT group call (either by initiating a group call to an emergency PTT group, or by initiating a group call with emergency status to a PTT group, or by converting an existing PTT group call to an emergency PTT group call) is given an emergency status and the highest priority to transmit. In this example, the UE initiating an emergency PTT call selects the highest priority PPPP for all PDUs it wishes to transmit.

A UE 10 allocates a transmission priority to data transmissions over the D2D channel in dependence on the priority level of a UE 10. A UE 10 with a high priority is able to allocate a high transmission priority, for example the highest available transmission priority, to all data transmissions.

In both these situations, a first UE 10 having a high priority level is able to transmit in precedence over other UE 10, which may restrict the ability of other UEs 10 to communicate.

In some circumstances, the UEs 10 that are restricted or prevented from communicating by the first UE may wish to interrupt the transmissions of the first UE. One situation in which this might occur is when a UE with a high priority level is transmitting in an emergency MCPTT group. If, for example, the user becomes unconscious, the UE will nevertheless continue transmitting in precedence to other UE even though the content of the transmissions is not useful. The ability of the emergency MCPTT group to communicate effectively to address the critical event is impaired.

Embodiments of the invention enable a first UE that has been allocated preferential use of resources to be interrupted by at least one other UE.

Figure 5A:
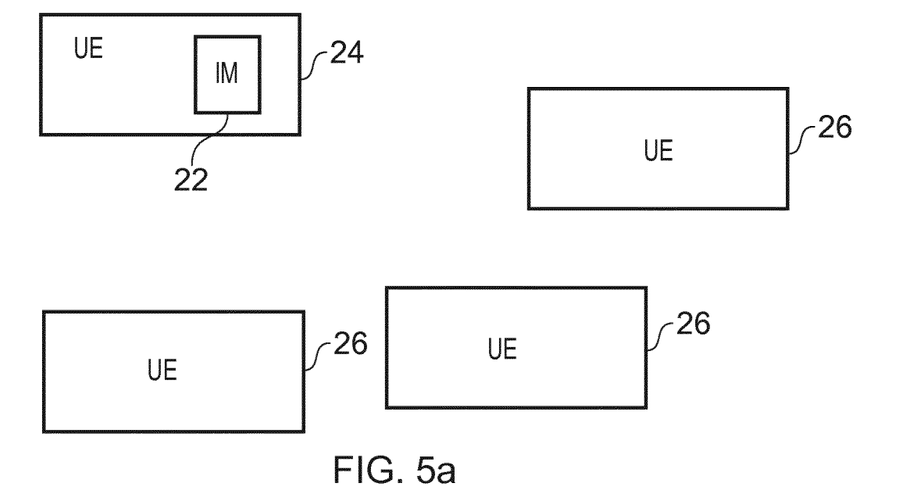
FIG. 5a is a block diagram illustrating a first arrangement of an interrupt manager and a plurality of UEs.
Figure 5B:
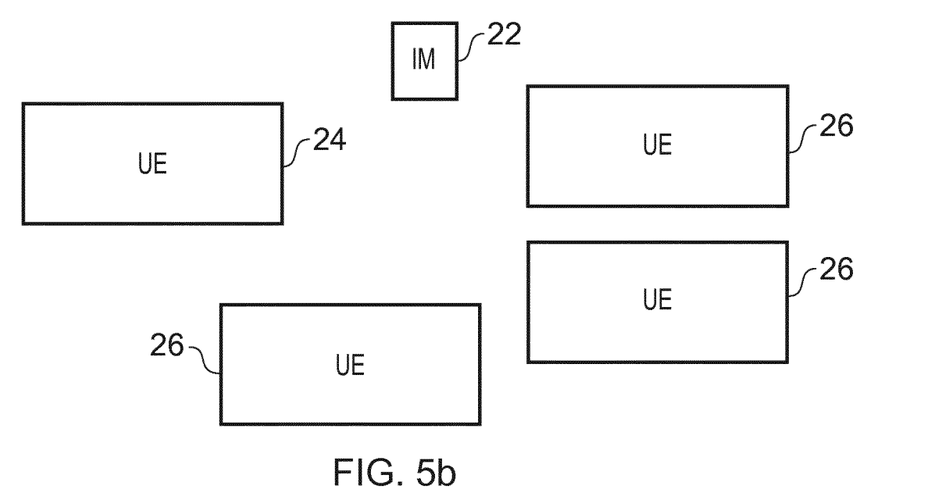
FIG. 5b is a block diagram illustrating a second arrangement of an interrupt manager and a plurality of UEs.

FIG. 5a and FIG. 5b are block diagrams illustrating arrangements of an interrupt manager (IM) 22 and a plurality of UEs 24, 26.

An interrupt manager (IM) 22 is provided to interrupt use of communication resources allocated to a first UE 24, in response to one or more interrupt requests received from other UEs 26. After interruption, the communication resources are available for allocation to other UEs 26, if required.

Three UEs 26 are shown in FIGS. 5a and 5b as examples of other UEs 26, although it will be appreciated that in different embodiments there may be any number of other UEs 26.

In FIG. 5a, first UE 24 comprises an interrupt manager 22. In one arrangement, first UE 24 and other UEs 26 are implemented as an off-network UE 10b described above with reference to FIG. 4. In one arrangement, first UE 24 and other UEs 26 form an off-network PTT group, and IM 22 is a floor controller 204 of first UE 24. In other arrangements, the other UEs 26 are other off-network UEs 10b sharing the D2D PC5 interface, that are not necessarily in an off-network group with first UE 24, in which case IM 22 is D2D manager 104.

In FIG. 5b, the IM 22 is an entity within the network 12. In one embodiment, the IM 22 is floor control server 300 for an on-network group including first UE 24 and other UEs 26.

Figure 6:
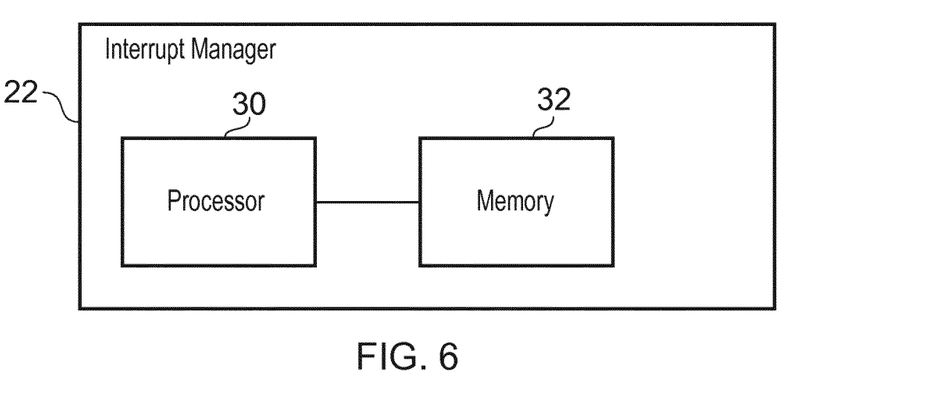
FIG. 6 is a block diagram showing an interrupt manager.

FIG. 6 is a block diagram showing an IM 22 comprising a processor 32 and a memory 34. The memory 34 contains instructions executable by the processor 32 to enable the IM 22 to carry out the method for interrupting use of communication resources in accordance with embodiments of the invention.

Figure 7:
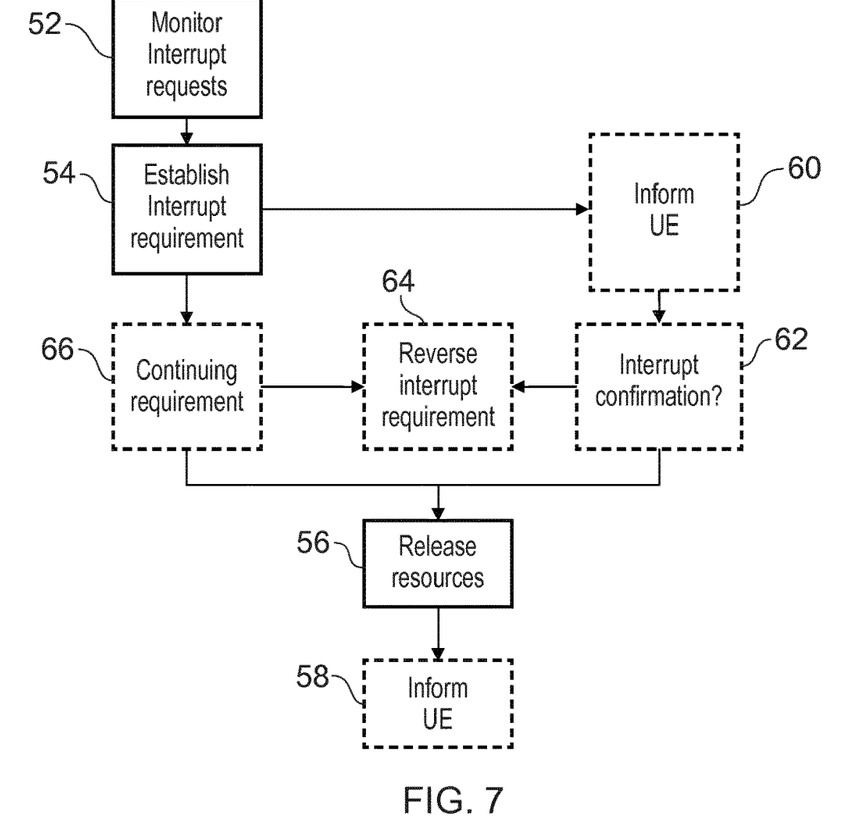
FIG. 7 is a flow chart showing a method of interrupting use of communication resources in accordance with embodiments of the invention.

The IM 22 operates as described below with reference to FIGS. 7 and 8. FIG. 7 is a flow chart showing a method of interrupting communication of a first UE 24 in accordance with embodiments of the invention. The interrupt is handled, and the interrupt method is carried out, by IM 22.

Disclosed embodiments of the invention may be used to interrupt communication of a first UE 24. The first UE 24 communicates by transmitting using communication resources of the network 12. The allocation of the communication resources to the first UE 24 is in precedence over other UEs 26, and may restrict or exclude the use of the communication resources by other UEs 26 to transmit, although the ability of the other UEs 26 to use the communication resources, for example to listen to transmissions using the communication resources, is otherwise unaffected.

As mentioned above, other UEs 26 may be group members of a PTT group to which the first UE 24 is transmitting, or may merely be other UEs 26 nearby that are affected by the use, by the first UE 24, of the communication resources, for example communication resources available on a D2D interface.

In a first step 52, the reception of interrupt requests (IRs) from other UEs 26, requesting interruption of communication by the first UE 24, is monitored by the IM 22.

In the disclosed embodiments, an IR is sent by one of the other UEs 26 in response to a user request of an interrupt received via the UI 100 of the other UE 26, for example by pressing an interrupt request button. A user with a relatively low communication priority level can request interruption of the preferential communication of a user with a higher communication priority level, for example because the user requesting interruption is able to see that the higher priority user is unconscious.

In a second step 54, the IM 22 determines an interrupt requirement (IReq) in response to the reception of at least one IR. In some embodiments, two or more IRs must be received to establish an IReq.

In a third step 56, the IM 22 releases the allocation of communication resources used by the first UE 24, in response to the determination of the IReq by the IM 22. Thus, communication by the first UE 24 is interrupted. The communication resources are then available for allocation to other UEs 26.

If step 56 is carried out by an IM 22 within network 12, in a further step 58 the IM 22 communicates the release of the allocation of the resources to the first UE 24.

After the release of allocation of resources by the IM 22, the first UE 24 is no longer allocated the communication resources and able to use them in precedence to other UEs 26 despite the existence of a user request at the first UE 24, for example continued PTT talk request.

In some embodiments, the release of the resources is achieved by a change in operation of the first UE 24 in response to the release of resource allocation in step 56 or in step 58, which prevents the first UE 24 from requesting resources or scheduling transmissions thereafter, at least on a priority basis.

In some embodiments, the release of resources results in a change in floor control operation such that a floor request, resulting for example from the continued PTT talk request at the first UE 24, received after the resources are released does not result in the grant of the floor to the first UE 24.

Thereafter, the resources are released and communication by the first UE 24 has been interrupted. The restoration of normal operation to a previously interrupted first UE 24 can be achieved in different ways, for example in response to action at any time by the user of the first UE 24 or by other UEs 26 analogous to the operation described below, and will not be explained in more detail herein.

In optional step 60, the IM 22 informs other UEs 26 of the interrupt. More specifically, after the IReq is established, the IM 22 sends a resource allocation release (RAR) to the other UEs 26. The RAR indicates release of the allocation of the first communication resources to the first UE 24.

In a further optional step 62, the IM 22 monitors reception of an interrupt confirmation (IC) from one or more of the other UEs 26 during a confirmation period. If at least one IC is received in the confirmation period, the IM 22 releases the allocation of resources in step 56. If no IC are received within a confirmation time period, the IM 22 reverses the IReq in step 64. Thereafter, the communication resources remain allocated to the first UE and no interrupt occurs.

In the disclosed embodiment, the IC and the IR are received from different other UEs 26. This ensures that the need for the interrupt is indicated by at least two other UEs 26 before being implemented.

In a further optional step 66, during a monitoring period after the IReq is established, the IM 22 determines whether the first UE 24 has a requirement for continuing allocation of the first communication resources. If no requirement for continuing use is determined during the monitoring period, the IM 22 releases the allocation of resources in step 56. If a requirement for continuing use is determined during the monitoring period, the IM 22 reverses the IReq in step 64. Thereafter, the communication resources remain allocated to the first UE 24 and no interrupt occurs.

Optional steps 60, 62, 64 and 66 are shown in Figure as occurring after the IReq is established by IM 22 in step 54, but before the release of resources allocation in step 56. However, these steps could also be carried out by IM 22 after the resources are released in step 56. In this case, the IM 22 is arranged to restore allocation of the first communication resources to the first UE 24 in response to the reversal of the IReq.

Figure 8:
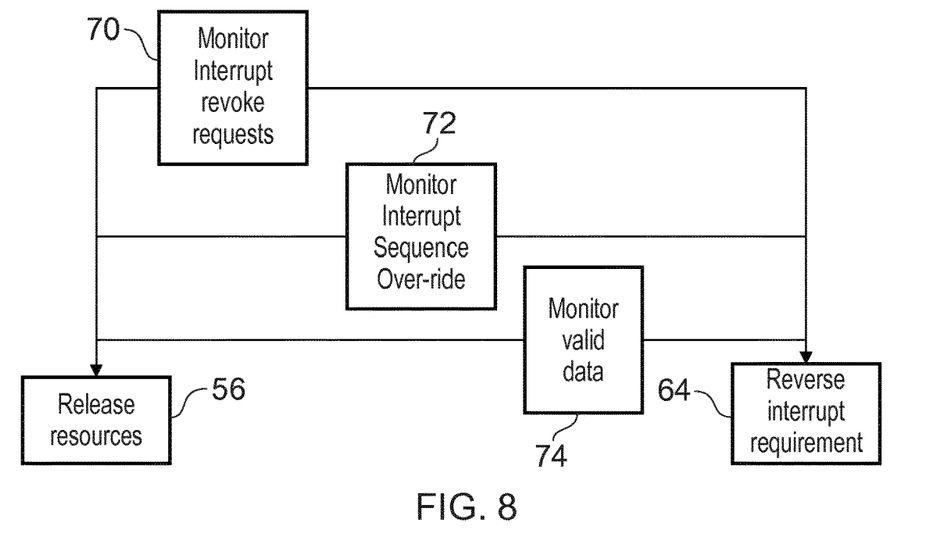
FIG. 8 is a flow chart showing a method of determining a requirement for continuing use of the communication resources.

FIG. 8 is a flow chart showing in more detail steps for determining whether there is a requirement for continuing use of the communication resources by first UE 24, despite the reception of one or more IRs.

In disclosed embodiments, the IM 22 uses an Interrupt Counter Monitor (ICM) in order to determine the duration of the monitoring period. At the end of the monitoring period, the ICM can be cleared.

It may be desirable to reverse the IReq and continue the use of resources by the first UE 24, because a nearby user may be able to see that the interrupted user is now conscious, and that it is no longer necessary to interrupt the first UE 24. In this case, the other user may revoke the interrupt, resulting in the communication by the priority user continuing.

In the disclosed embodiment, Interrupt revoke requests (IRRs) are sent by other UEs 26 in response to a user request, at the other UEs 26, to revoke the interrupt made. The user request may be made via the UI 204 of the UEs 26, for example by pressing an IRR button.

In step 70, the IM 22 monitors for reception of one or more IRR from other UEs 26, revoking the request to interrupt communication by UE 24.

If no IRRs are received during the monitoring period, the IM 22 acts on the previously established IReq and in step 56 the resources are released. If IRRs are received in the monitoring period, the IM 22 reverses the IReq in step 64, and the first UE 24 is able to continue communicating without interruption. In the disclosed embodiment, the number of IRR required to revoke the established IReq is one.

It may be desirable to reverse the IReq and continue the use of resources by the first UE 24, if the user of the first UE 24 is still active and intends to continue use of the communication resources.

In this situation, the user of the first UE 24 must be notified of the IReq, for example via an interrupt notification presented to the user via UI 100 of the first UE 24. The user of first UE 24 may request an interrupt sequence over-ride (ISO) if priority communication is still required.

An ISO is generated in the first UE 24 in response to a user request to over-ride the interrupt. In disclosed embodiments, the user request to over-ride the interrupt is made via the UI 204 of UE 24, for example by pressing an interrupt over-ride button. Typically, user action necessary to request the ISO is different from the normal user action required to request communication resources, so that the generation of an ISO by the user is readily distinguished from a simple request to talk. In disclosed embodiments, a dedicated over-ride button is provided separately from the PTT button.

In step 72, the IM 22 monitors the reception of an ISO from the user of the first UE 24.

If no ISO is received in the monitoring period, the IM 22 acts on the previously established IReq, and in step 56 the resources are released. If an ISO is received, the IM 22 cancels the IReq in step 64, and the first UE 24 is able to continue communicating without interruption.

It may be desirable to reverse the IReq and continue use of resources by the first UE 24, if useful data is being transmitted by the first UE 24.

In step 74, the IM 22 monitors communication of the first UE 24 in a monitoring period to determine whether valid speech or other valid user data is being transmitted.

If no valid data is detected during the monitoring period, the IM 22 acts on the established IReq, and in step 56 the resources are released. If valid data is received, the IM 22 cancels the IReq in step 64 and the first UE 24 is able to continue communicating without interruption.

It may be desirable for the communication of the first UE 24 that is problematic for other UEs 26 be interrupted during a monitoring period, while allowing the first UE 24 to continue communicating. In this way, the first UE 24 remains able to communicate during the monitoring period, but the impact on other UEs 26 is minimised.

As an example, in some embodiments the IM 22 transfers the first UE 24 to a monitoring channel, and the transmissions of the first UE 24 on the monitoring channel are monitored in step 74 to determine whether valid data is being transmitted.

If the IM 22 has indicated to the other UEs 26 that an IReq has been established, in step 60 as described above, the IM 22 may indicate to the other UEs 26 that the interrupt requirement is cleared. In this way, the other UE are kept informed as to the interruption of the communication of the first UE 24, and the availability of the communication resources for re-allocation.

In a first embodiment, the methods described above with reference to FIGS. 7 and 8 are carried out by the floor control server 300 for a group of on-network UEs including UE 24 and other UEs 26 in a PTT group. In this embodiment, the floor control server 300 acts as the IM 22.

In this embodiment, the first UE 24 has a high priority level, and has requested communication resources, for example as a result of a PTT user indication. The first UE 24 has been granted the floor, and as a result the other UE 26 are excluded from transmitting to the group. The operation of normal floor protocols does not enable other UE 26 having a lower priority level than the priority level of first UE 24 to obtain grant of the floor unless the PTT user indication for first UE 24 is released. If the first UE 24 has the highest priority level, none of the other UEs 26 are able to obtain grant of the floor unless the PTT indication for the first UE 24 is released.

The floor control server 300 receives an IR from at least a first other UE 26. An IR is a message within the floor control protocols, and is received from the floor participant 200 of first other UE 26. In the disclosed embodiment, the floor control server 300 acknowledges receipt of received IR.

The floor control server 300 determines an IReq in response to reception of at least one IR floor control message.

In response to the establishment of an IReq, in some embodiments a "floor interrupt" or "floor release" message is sent to the other group members. In response to the IReq, the floor control server 300 initiates an Interrupt Sequence (IS) for first UE 24. The IS for first UE 24 may be signalled to the first UE 24.

In order to release the communication resources, the floor control server 300 releases the floor. In the disclosed embodiment, the floor control server 300 moves the first UE 24 to a "denied floor" state, and revokes the grant of the floor to the first UE 24. The floor control server 300 informs the other UEs 26 of the release of the floor by sending floor release messages to all other UEs 26. If the floor control server 300 operates a floor grant queue, the floor control server 300 grants the floor to the one of the other UEs 26 at the top of the queue.

Thereafter, the floor control server 300 considers the first UE 24 to be in a blocked state, and further floor request messages received from the first UE 24, for example resulting from a continued user PTT indication, are ignored until the first UE 24 is unblocked. In the disclosed embodiment this may be achieved using a state machine.

In disclosed embodiments, the floor control server 300 uses an Interrupt Counter Monitor (ICM) in order to determine the duration of a monitoring period. At the end of the monitoring period, the ICM can be cleared.

In this embodiment, the IRR and the ISO are floor control messages received by the floor control server 300 from the other UEs 26, or from the first UE 24, respectively.

If an IRR message is received from at least one other UE 26, or an ISO is received from the first UE 24, within the monitoring period after the IReq is established, the floor control server 300 maintains grant of the floor to the interrupted UE 10. If release of the communication resources is confirmed at the end of the monitoring period, the floor control server 300 releases grant of the floor, as described above.

Monitoring of the communication of the first UE 24 for useful data may be achieved in this embodiment as an aspect of the Multi-Party Conference (MPC) control used in IMS. A MPC bridge controls the user plane connections for the PTT group members so that the bearer connections for the PTT group members remain in place, but the first UE 24 is muted. The bearer for the first UE 24 is independently monitored for useful data by a termination in the context of the MPC bridge without affecting the other group members. The floor control server 300 receives an event from the termination in the MPC bridge if useful data is detected. This feature can be implemented by 3GPP specific profiles of the ITU-T H.248 protocol.

In a second embodiment, the IM 22 carrying out the method of FIGS. 7 and 8 is a PTT control server 30 acting as a global group handler (GGH) handling more than one concurrent on-network PTT group. This embodiment is useful for handling interrupts between PTT groups operating at the same time that may interfere with each other, for example when one PTT group is supported by a pico-cell. In this situation, the other UEs 26 are the other PTT group members of all PTT groups handled by the GGH.

The IM 22 co-ordinates IR from group members of any of the concurrently operating PTT groups and allows IR received from other UE 26 operating in more than one group to be considered in determining an interrupt requirement.

In a third embodiment, the methods described above with reference to FIGS. 7 and 8 are carried out by the floor controller 204 of the first UE 24, within in an off-network PTT group including UE 24 and the other UEs 26. In this embodiment, the floor controller 204, or more generally the PTT client 20, acts as the IM 22.

In this embodiment, the first UE 24 has a high priority level, and has requested communication resources, for example as a result of a PTT user indication. The first UE 24 has been granted the floor, and as a result the other UE 26 are excluded from transmitting to the group. The operation of normal floor protocols does not enable other UE 26 to obtain grant of the floor unless the PTT user indication for first UE 24 is released. If the first UE 24 has the highest priority level, none of the other UEs 26 are able to obtain grant of the floor unless the PTT indication for the first UE 24 is released.

The floor controller 204 receives an IR from at least a first other UE 26. An IR is a message within the floor control protocols, and is received from the floor participant 200 of first other UE 26. In the disclosed embodiment, the floor controller 204 acknowledges receipt of received IR.

The floor controller 204 determines an IReq in response to reception of at least one IR floor control messages.

In response to the establishment of an IReq, in some embodiments a "floor interrupt" or "floor release" message is sent to the other group members.

In response to the IReq, the floor controller 204 initiates an Interrupt Sequence (IS) for the first UE 24. The IS for first UE 24 may be signalled to the first UE 24.

In order to release the communication resources, the floor controller 204 releases the floor. In the disclosed embodiment, the floor controller 204 moves the first UE 24 to a "denied floor" state. The floor is now available for other UE 26, and the floor controller 204 informs the other group members of the release of the floor by sending a floor release message to the respective floor participants 200 of the other UE 26. If the floor controller 204 operates a floor grant queue, the floor controller 204 grants the floor to the one of the other UEs 26 at the top of the queue.

Thereafter, the floor can be granted to any other UE 26 that requests the floor, in accordance with general floor operation protocols, and the floor controller 204 of that UE 26 will assume responsibility for the floor control of the PTT group. While the interrupted first UE 24 remains in a floor denied state, any current floor controller 204 will not grant floor requests received from the interrupted first UE 24.

In disclosed embodiments, the floor controller 204 uses an Interrupt Counter Monitor (ICM) in order to determine the duration of a monitoring period. At the end of the monitoring period the ICM can be cleared.

In this embodiment, the IRR are floor control messages received by the floor controller 204 from the other UEs 26, and the ISO is received directly from the user of the first UE 24 via the UI 100.

If an IRR message is received from at least one other UE 26 or an ISO is received from the user of the first UE 24 within the monitoring period after the IReq is established, the floor controller 204 maintains grant of the floor to the first UE 24, and does not move the first UE 24 to the "floor denied" state.

In the disclosed embodiment, the first UE 24 is allowed to continue transmitting for a monitoring period. In a disclosed embodiment, during this period, the PTT client 20 of first UE 24 instructs its D2D manager 104 to schedule transmissions on the PSSCH channel, but at a restricted frequency, so for example the first UE 24 is allowed to schedule transmissions only every other scheduling period. In this way, the resources in the D2D PC5 interface are made more available for other UE 26, whether the other UE 26 members with first UE 24 of a PTT group or not.

In this disclosed embodiment, the other UE 26 monitor the transmissions of the interrupted first UE 24 during the monitoring period after receipt of the "floor interrupt" message sent in response to the establishment of the IReq. If valid data is detected during the monitoring period, as indicated by user input via the UI 100 of other UEs 26, the PTT clients 20 of the other UE 26 send a "floor maintenance" message to the floor controller 204 of first UE 24. In response to reception of at least one "floor maintenance" message, the floor controller 204 maintains grant of the floor to the first UE 24 as described above. If valid data is not detected, no "floor maintenance" message is sent by the other UEs 26, and the floor is released as described above.

In a fourth embodiment, first UE 24 is transmitting on the D2D PC5 interface, and the method of FIGS. 7 and 8 is carried out by the D2D manager 104 in a first UE 24.

In this embodiment, the first UE 24 has a high priority level and has requested communication resources, for example as a result of the PTT user indication. The first UE 24 is therefore able to schedule its transmissions over the D2D PC5 interface with a high priority, for example, by selecting a high priority PPPP for any PDU for transmission over the D2D PC5 interface. If the first UE 24 has the highest priority level, the first UE 24 selects the highest priority PPPP for all PDUs to be transmitted. The communication resources on the D2D PC5 interface are allocated to transmit PDUs having the highest priority PPPP. Other UE 26 wishing to transmit over the D2D PC5 interface are not able to do so because the D2D PC5 interface resources are allocated for use by first UE 24 having a higher priority level, which restricts the availability of D2D communication resources for other UE 26 in the area, whether the other UE 26 is a group member of an off-network PTT group, or any other UE in the surrounding area.

In the disclosed embodiment, the lack of availability of resources in the D2D PC5 interface can be determined when the inter-UE transmission queue cannot be sent using the transmission resources available on the D2D PC5 interface. The lack of available resources may be communicated to the other UEs 26 via a Scheduling Assignment Rejection (SAR) received by other UEs 26, or may be determined within the other UEs 26.

The determination of a lack of resources, for example by receipt of a SAR by first other UE 26, triggers the first other UE 26 to present an interrupt query to the user of first other UE 26 via the UI 100. A positive user input received via the UI 100 of first other UE 26 in response to the interrupt query triggers the first other UE 26 to send an interrupt request to IM 22.

In the disclosed embodiment, the interrupt request is an enhanced Scheduling Assignment (eSA) or PSCCH control message. The interrupt request is sent more than once, or periodically, until the interrupt is successful or is cancelled.

In addition to the transmission of data packets, the D2D manager 104 of first UE 24 is able to monitor D2D PC5 interface for IR signalling from other UEs 26. In particular, the D2D manager 102 is able to receive an Enhanced Scheduling Assignment (eSA) or other PSCCH control message on the PSCCH.

The D2D manager 104 acts as an interrupt manager IM 22 in this embodiment, and monitors the receipt of the interrupt requests from other UEs 26.

In response to reception of at least one IR, the D2D manager 104 determines an IReq and, in response to the determination of the IReq, the first UE 24 stops transmitting with high priority.

The D2D manager 104 transmits an acknowledgment of the Interrupt request and an indication that the interrupt request has been successful.

The D2D manager 104 transmits an "I am muted" message to other UEs 26 to remind them of the interrupt action taken.

In the disclosed embodiment, the acknowledgement of the interrupt request is communicated with the last SA sent on the PSCCH prior to the last transmission pattern. Thereafter the D2D manager 104 stops scheduling transmissions.

The D2D manager 104 may also inform the higher layers within the first UE 24 that resource allocation has been interrupted and/or revoked. The D2D manager 104 and/or MAC layer within the interrupted first UE 24 may also allocate a state of "denied" such that further resource allocation requests from higher layers are rejected.

In this embodiment, IRR can be communicated to the D2D manager 104 as IRR signalling on the PSCCH. In response to reception of IRR, the D2D manager 104 can resume sending PDUs with high priority. In the disclosed embodiment, the D2D manager 104 also acknowledges the IRR using signalling on the PSCCH.

If the user of the first UE 24 wishes to continue the priority transmission despite the interrupt, the user can over-ride the interrupt request from the other users. In the disclosed embodiment, the D2D manager 104 notifies the user that an IReq is established by sending a notification via the UI 100. A user may over-rides the interrupt requirement using an over-ride option, for example by pressing an over-ride button provided in the UI 100.

In response to the over-ride instruction from the user, the D2D manager 104 rejects the IR, and continues transmitting on the D2D PC5 interface. In the disclosed embodiment, the D2D manager 104 informs the other UEs 26 of the rejection of the interrupt request using interrupt request signalling on the PSCCH.

In the disclosed embodiment, the first UE 24 is allowed to continue transmitting for a monitoring period. In the exemplary embodiment during this period, the PTT client 20 of first UE 24 instructs its D2D manager 104 to schedule transmissions, but at a restricted frequency, so for example the first UE 24 is allowed to schedule transmissions only every other scheduling period. In this way, the resources in the D2D PC5 interface are made more available for nearby other UE 26, whether the other UEs 26 are group members or not.

In the disclosed embodiment, the other UEs 26 can monitor transmissions of the interrupted first UE 24 during the monitoring period. If valid data is detected during a monitoring period, as indicated by user input via the UI 100 of the other UEs 26, the PTT 20 of other UEs can send an interrupt revoke request (IRR) or other message reversing the established interrupt requirement.

Other UE 26 in the area monitoring the D2D PC5 interface can receive the acknowledgement of the interrupt, and sent an interrupt confirmation (IC). In the disclosed embodiment, the interrupt confirmation is a PSCCH control message.

The D2D manager 104 is able to monitor the PSCCH for IC signalling from other UEs 26 during a confirmation period. If IC signalling is received from at least one other UE 26 during the confirmation period, the interrupt is confirmed, and the allocation of the communication resources to first UE 24 is released. If D2D manager 104 does not detect the IC signalling in the confirmation period, the interrupt is confirmed.

It is noted that the interrupt mechanism via the D2D PC5 interface described above may also be used even if the first UE 24 is in an on-network MCPPT group and is not itself transmitting using the D2D PC5 interface. In this case, the D2D manager 104 receiving the interrupt requests via the D2D PC5 interface can inform the floor controller 200 of the interrupt requests. The floor controller 200 handles the interrupt requests using floor control protocols, as described above and/or instructs the D2D manager 104 to respond using the D2D PC5 interface.

In the disclosed embodiment, the correct operation of UEs, as a group, during a mission critical event is achieved firstly by enabling UEs to discover the existence of the mission critical event by detecting transmissions within a mission critical group, as identified by the use of an EGI, and by configuring UEs with rules governing their behaviour, to ensure that each UE responds appropriately to the emergency situation. However, in other embodiments, it is not necessary for a specific EGI to be used for an emergency PTT group, and an emergency PTT group call may result from the initiation of a PTT group call to a PTT group with emergency status, or the conversion of an existing PTT group call to an emergency status. In addition, in other embodiments, the behaviour of the first UE 24 and other UEs 26 may be regulated in some way other than the selection of appropriate priority levels applied to transmissions by each UE.

The disclosure provides methods and apparatus enabling interrupt of use of communication resources by a UE where that use is excluding use of the communication resources by other UE. Embodiments of the invention may be used to enable interruption of a high priority user by a co-ordinated or synchronised interrupt requests from UEs with a lower priority.

Use of the words "apparatus", "server", "device", "processor" and so on are intended to be general rather than specific. Whilst these features of the disclosure may be implemented using an individual component, such as a computer or a central processing unit (CPU), they can equally well be implemented using other suitable components or a combination of components. For example, they could be implemented using a hard-wired circuit or circuits, e.g. an integrated circuit, or using embedded software.

It can also be appreciated that the method can be implemented, at least in part, using computer program code. According to another aspect of the present disclosure, there is therefore provided computer software or computer program code adapted to carry out the method described above when processed by a computer processing means. The computer software or computer program code can be carried by computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The disclosure also extends to a processor running the software or code, e.g. a computer configured to carry out the method described above.

The invention claimed is:

1. An apparatus for interrupting use of first communication resources of a communication network used by a first user equipment, UE, having a first priority level, which first communication resources are allocated to the first UE in precedence over other UEs having the same priority as or a lower priority level than the first UE, the apparatus comprising:
   an interrupt manager arranged to monitor reception of interrupt requests, each interrupt request being received from one of the other UEs, to establish an interrupt requirement in response to reception of one or more interrupt requests, the interrupt requirement enabling interruption of a high priority user by one of co-ordinated and synchronised interrupt requests from UEs with a lower priority level, and to release the allocation of the first communication resources to the first UE in response to the interrupt requirement being established.

2. The apparatus as claimed in claim 1, wherein use by the first UE of the allocated resources is to the exclusion of the other UEs.

3. The apparatus as claimed in claim 1, wherein the interrupt manager is arranged to determine a respective time of reception of each interrupt request, and to establish the interrupt requirement when at least two interrupt requests are received in a single interrupt period.

4. The apparatus as claimed in claim 1, wherein the interrupt manager is arranged to send a resource allocation release (RAR) to the other UEs after the establishment of the interrupt requirement, the resource allocation release indicating release of the allocation of the first communication resources to the first UE.

5. The apparatus as claimed in claim 4, wherein after sending a resource allocation release, the interrupt manager is configured to monitor reception of an interrupt confirmation from one or more of the other UEs, and to reverse the interrupt requirement unless at least one interrupt confirmation is received within a confirmation time period.

6. The apparatus as claimed in claim 1, further comprising the interrupt manager, after the interrupt requirement is established, being configured to at least one of:
   determine whether the first UE as a requirement for continuing use of the first communication resources, and to reverse the established interrupt requirement if the requirement for continuing use is determined during a monitoring period;
   monitor reception of interrupt revoke requests from the other UEs and to reverse the established interrupt requirement if at least one interrupt revoke request is received during a monitoring period;
   monitor reception of an interrupt sequence over-ride, ISO, from the first UE and to reverse the established interrupt requirement if an ISO is received during a monitoring period; and
   monitor the use of communication resources of the communication network by the first UE to detect transmission of valid data, and to reverse the established interrupt requirement if valid data is detected during a monitoring period.

7. The apparatus as claimed in claim 6, wherein, in response to the reversal of the interrupt requirement, the interrupt manager is arranged to restore allocation of the first communication resources to the first UE.

8. The apparatus as claimed in claim 1, wherein each of the first UE and the other UEs is configured with a respective priority level, and the allocation of the first communication resources of the communication network is determined by the respective priority levels.

9. The apparatus as claimed in claim 8, wherein at least one of:
the configuring of the priority level is dynamic and triggered by a higher layer application; and
the respective priority level of at least one of the first UE and the other UEs is based on a user attribute associated to the respective one of the first UE and the other UEs and a group attribute associated with a group to which the respective one of the first UE and the other UEs belongs.

10. The apparatus as claimed in claim 1, wherein the first UE and other UEs belong to a group and the interrupt manager comprises a floor controller for the group that determines which member of the group is allocated use of the first communication resources, the floor controller being arranged to receive the interrupt requests by using floor control protocols and to release the allocation of the first communication resources to the first UE by using floor control protocols that revoke grant of the floor to the first UE.

11. The apparatus as claimed in claim 1, in which the interrupt manager is arranged to inform the first UE of the release of the allocation of the communication resources.

12. The apparatus as claimed in claim 1, wherein one of:
the interrupt manager comprises a D2D manager configured to schedule transmissions by the first UE, and is configured to receive one or more interrupt requests on a scheduling control channel and to release the allocation of the first communication resources to the first UE by stopping scheduling transmissions by the first UE; and
each interrupt request is received on a control channel used by the first UE and the other UEs to schedule communications.

13. The apparatus as claimed in claim 1, wherein the first UE incorporates the apparatus.

14. A method for interrupting use of first communication resources of a communication network used by a first user equipment, UE, having a first priority level, which first communication resources are allocated to the first UE in precedence over other UEs, each other UE having the same priority level as or a lower priority level than the first UE, the method comprising:
monitoring reception of interrupt requests, each interrupt request being received from one of the other UEs;
establishing an interrupt requirement in response to reception of one or more interrupt requests, the interrupt requirement enabling interruption of a high priority user by one of co-ordinated and synchronised interrupt requests from UEs with a lower priority; and
releasing the allocation of the first communication resources to the first UE in response to the interrupt requirement being established.

15. An apparatus for interrupting use of first communication resources of a communication network used by a first user equipment, UE, having a first priority level, which first communication resources are allocated to the first UE in precedence over other UEs having the same priority level as or a lower priority level than the first UE, the apparatus comprising a processor and a memory, the memory containing instructions executable by the processor, the apparatus being configured to:
monitor reception of interrupt requests, each interrupt request being received from one of the other UEs;
establish an interrupt requirement in response to reception of one or more interrupt requests, the interrupt requirement enabling interruption of a high priority user by one of co-ordinated and synchronised interrupt requests from UEs with a lower priority; and
release the allocation of the first communication resources to the first UE in response to the interrupt requirement being established.

16. The apparatus as claimed in claim 2, wherein the interrupt manager is arranged to determine a respective time of reception of each interrupt request, and to establish the interrupt requirement when at least two interrupt requests are received in a single interrupt period.

17. The apparatus as claimed in claim 16, wherein the interrupt manager is arranged to send a resource allocation release (RAR) to the other UEs after the establishment of the interrupt requirement, the resource allocation release indicating release of the allocation of the first communication resources to the first UE.

18. The apparatus as claimed in claim 2, wherein the interrupt manager is arranged to send a resource allocation release (RAR) to the other UEs after the establishment of the interrupt requirement, the resource allocation release indicating release of the allocation of the first communication resources to the first UE.

19. The apparatus as claimed in claim 18, wherein after sending a resource allocation release, the interrupt manager is configured to monitor reception of an interrupt confirmation from one or more of the other UEs, and to reverse the interrupt requirement unless at least one interrupt confirmation is received within a confirmation time period.

20. The apparatus as claimed in claim 2, further comprising the interrupt manager, after the interrupt requirement is established, being configured to at least one of:
determine whether the first UE has a requirement for continuing use of the first communication resources, and to reverse the established interrupt requirement if the requirement for continuing use is determined during a monitoring period;
monitor reception of interrupt revoke requests from the other UEs and to reverse the established interrupt requirement if at least one interrupt revoke request is received during a monitoring period;
monitor reception of an interrupt sequence over-ride, ISO, from the first UE and to reverse the established interrupt requirement if an ISO is received during a monitoring period; and;
monitor the use of communication resources of the communication network by the first UE to detect transmission of valid data, and to reverse the established interrupt requirement if valid data is detected during a monitoring period.

* * * * *